(12) United States Patent
Jun et al.

(10) Patent No.: US 8,288,898 B2
(45) Date of Patent: Oct. 16, 2012

(54) LINEAR VIBRATOR HAVING PLATE-SHAPED SPRINGS

(75) Inventors: Jae-Woo Jun, Suwon-si (KR); Jun-Kun Choi, Suwon-si (KR); Hwa-Young Oh, Seoul (KR); Yong-Jin Kim, Suwon-si (KR); Kyung-Ho Lee, Suwon-si (KR); Seok-Jun Park, Suwon-si (KR); Kwang-Hyung Lee, Suwon-si (KR); Je-Hyun Bang, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 190 days.

(21) Appl. No.: 12/786,919

(22) Filed: May 25, 2010

(65) Prior Publication Data
US 2010/0327673 A1 Dec. 30, 2010

(30) Foreign Application Priority Data

May 25, 2009 (KR) .................. 10-2009-0045437
Nov. 6, 2009 (KR) .................. 10-2009-0107104

(51) Int. Cl.
*H02K 33/18* (2006.01)
*H02K 33/16* (2006.01)
*H02K 33/00* (2006.01)

(52) U.S. Cl. ............ 310/13; 310/14; 310/30; 310/34; 310/15

(58) Field of Classification Search .......... 310/13–15, 310/25, 27, 28, 30, 34
See application file for complete search history.

(56) References Cited

U.S. PATENT DOCUMENTS

| 5,736,797 | A  | * | 4/1998  | Motohashi et al. ............ 310/36 |
| 6,441,571 | B1 | * | 8/2002  | Ibuki et al. ..................... 318/114 |
| 6,991,217 | B2 | * | 1/2006  | Shimizu et al. ............... 251/284 |
| 7,082,668 | B2 | * | 8/2006  | Ando et al. ..................... 29/594 |
| 7,443,060 | B2 | * | 10/2008 | Kawahashi et al. ........ 310/12.04 |
| 2006/0066154 | A1 | * | 3/2006  | Ogino et al. .................... 310/15 |
| 2007/0236088 | A1 | * | 10/2007 | Miura ............................. 310/15 |
| 2009/0096299 | A1 | * | 4/2009  | Ota et al. ........................ 310/25 |
| 2011/0115310 | A1 | * | 5/2011  | Dong et al. .................... 310/28 |

FOREIGN PATENT DOCUMENTS

| JP | 2004057958    | * | 2/2004  |
| KR | 1020050043072 | * | 11/2006 |

OTHER PUBLICATIONS

Machine translation of KR1020050043072, Kim et al., Nov. 2006.*
Machine translation of JP2004057958, Yamaguchi et al., Feb. 2004.*
Chinese Office Action, and English translation thereof, issued in Chinese Patent Application No. 201010188295.1 dated May 17, 2012.

* cited by examiner

*Primary Examiner* — Quyen Leung
*Assistant Examiner* — Terrance Kenerly
(74) *Attorney, Agent, or Firm* — McDermott Will & Emery LLP

(57) ABSTRACT

A linear vibrator is disclosed. In accordance with an embodiment of the present invention, the linear vibrator includes a base, a coil unit, which is coupled to the base, a magnet, which is coupled to the coil unit such that the magnet can move relatively with respect to the coil unit, and a leaf spring, which is interposed between the magnet and the base and includes a plurality of plate-shaped members having center portions thereof being separated from one another and both respective ends thereof being coupled to one another. Thus, the linear vibrator can increase the range of displacement in the leaf spring and increase the magnitude of vibration in the linear vibrator.

8 Claims, 12 Drawing Sheets

LINEAR VIBRATOR HAVING PLATE-SHAPED SPRINGS

CROSS-REFERENCE TO RELATED APPLICATIONS

This application claims the benefit of Korean Patent Application No. 10-2009-0045437 and No. 10-2009-0107104, filed with the Korean Intellectual Property Office on May 25, 2009, the disclosure of which is incorporated herein by reference in its entirety.

BACKGROUND

1. Technical Field

The present invention is related to a linear vibrator.

2. Description of the Related Art

A linear vibrator is a part that converts electrical energy into mechanical vibrations by using the principle of generating electromagnetic forces, and is commonly installed in a mobile phone to generate a soundless vibrating alert.

With the rapid expansion of mobile phone markets and increased functionalities added to the mobile phone, mobile phone parts are increasingly required to be smaller and better. As a result, there has been an increased demand for the development of a new structure of linear vibrator that can overcome the shortcomings of conventional linear vibrators and effectively improve the quality.

As mobile phones having a bigger LCD screen have become popular for the past few years, there have been an increasing number of mobile phones adopting a touch-screen method, by which vibration is generated when the screen is touched. Touch screens particularly require that the linear vibrator has a greater durability due to a greater frequency of generating the vibration in response to the touch compared to the vibration bell for incoming calls and that the vibration has a faster response to the touch made on the touch screen, in order to provide a user a greater satisfaction from sensing the vibration when touching the touch screen.

The conventional linear vibrator commonly used in mobile phones generates a rotational force to cause mechanical vibrations by rotating an eccentric (unbalanced) weight. The rotational force is generated by supplying an electric current to the coil of a rotor through point contacts between a brush and a commutator by way of rectifying action.

However, the brush type structure using such commutator has a shorter motor life due to mechanical friction and electrical sparks, which cause wear and black powder, between the brush and the commutator when the motor rotates. Moreover, when voltage is supplied to the motor, it takes time to reach the target magnitude of vibration by the rotational inertia of the motor. Thus, it is difficult to implement the vibration that is appropriate for touch screen phones.

Furthermore, although a linear vibrator uses an electromagnetic force having a predetermined resonant frequency to generate vibrations by use of a spring installed in the vibrator and a mass coupled to the spring, it is difficult to obtain a sufficient magnitude of vibration due to the space limitation because mobile devices in which the linear vibrator is installed become thinner.

SUMMARY

The present invention provides a linear vibrator with a simple structure that can increase the magnitude of vibration.

An aspect of the present invention provides a linear vibrator that includes a base, a coil unit, which is coupled to the base, a magnet, which is coupled to the coil unit such that the magnet can move relatively with respect to the coil unit, and a leaf spring, which is interposed between the magnet and the base and includes a plurality of plate-shaped members having center portions thereof being separated from one another and both respective ends thereof being coupled to one another.

The leaf spring can include a first plate-shaped member having a center portion thereof being coupled to the magnet and a second plate-shaped member having a center portion thereof being coupled to the base. The first plate-shaped member and the second plate-shaped member can be parallel to each other. The first plate-shaped member and the second plate-shaped member can be curved symmetrically about center portions thereof. The first plate-shaped member and the second plate-shaped member can be extended tilting symmetrically from both ends thereof to the center.

The leaf spring can be interposed between either end of the magnet and the base. A hollow part can be formed in the coil unit, and the magnet can be inserted into the hollow part.

The linear vibrator can further include a bobbin, which is coupled to the hollow part of the coil unit such that the coil unit can be coupled to the base and in which the magnet is inserted into the bobbin. The magnet can be inserted into the bobbin in such a way that the magnet can move horizontally.

The linear vibrator can further include a weight, which is coupled to the magnet. The linear vibrator can further include a yoke, which is interposed between the magnet and the weight and surrounds the magnet.

Additional aspects and advantages of the present invention will be set forth in part in the description which follows, and in part will be obvious from the description, or may be learned by practice of the invention.

DETAILED DESCRIPTION

Figure 1:
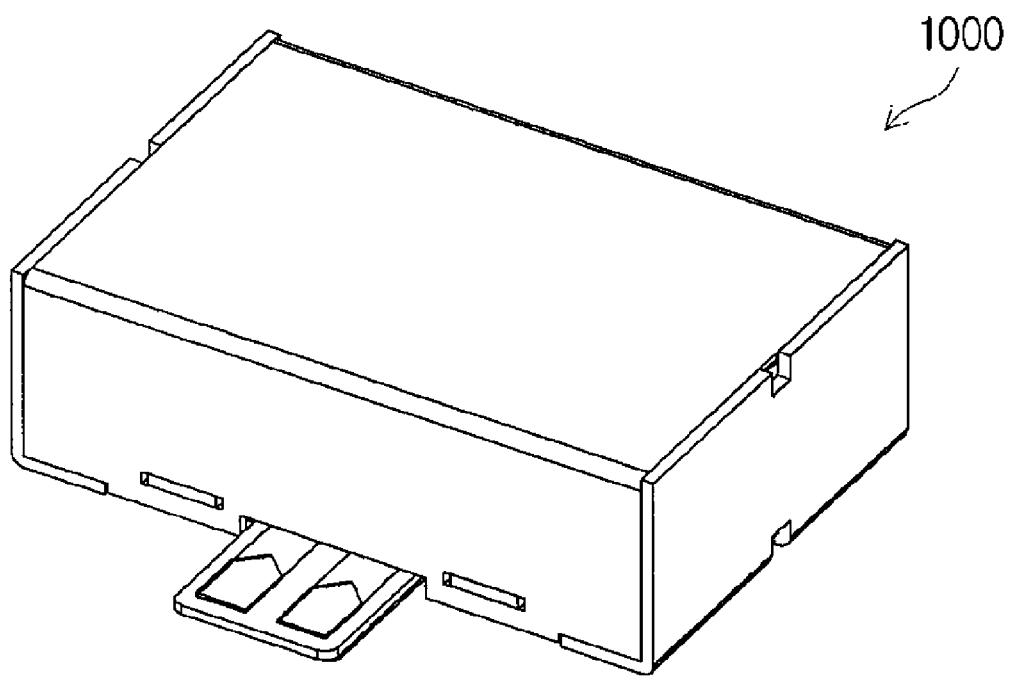
FIG. 1 is a perspective view of a linear vibrator in accordance with an embodiment of the present invention.

The features and advantages of this invention will become apparent through the below drawings and description.

A linear vibrator according to certain embodiments of the present invention will be described below in more detail with reference to the accompanying drawings. Those components that are the same or are in correspondence are rendered the same reference numeral regardless of the figure number, and redundant descriptions are omitted.

Figure 2:
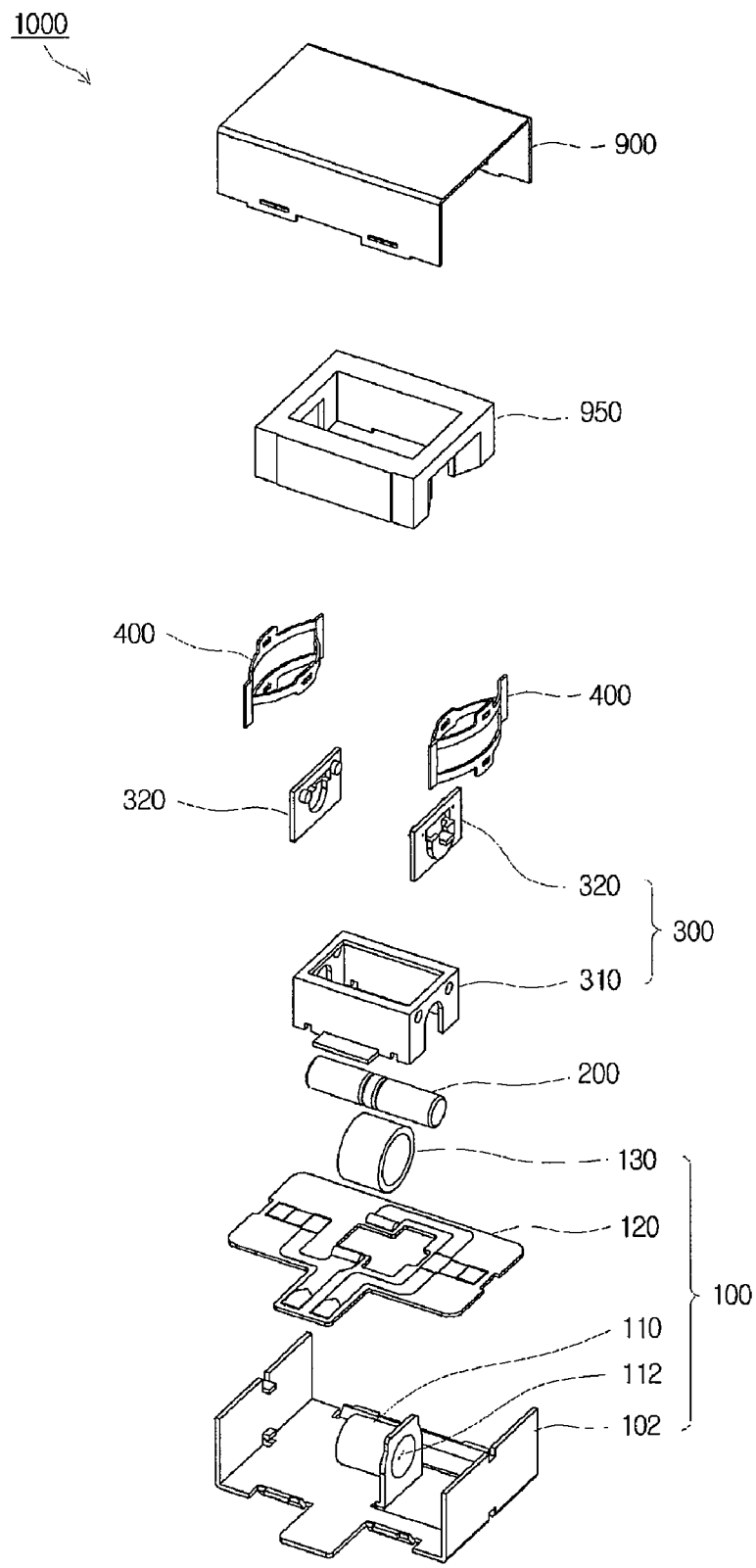
FIG. 2 is an exploded perspective view of a linear vibrator in accordance with an embodiment of the present invention.

FIG. 1 is a perspective view of a linear vibrator 1000 in accordance with an embodiment of the present invention, and FIG. 2 is an exploded perspective view of a linear vibrator 1000 in accordance with an embodiment of the present invention. As illustrated in FIGS. 1 and 2, a linear vibrator 1000 in accordance with an embodiment of the present invention includes a base 102, a coil unit 130, a magnet 200, a weight 950 and a leaf spring 400. Thus, the linear vibrator 1000 can increase the range of displacement in the leaf spring 400 and increase the magnitude of vibration in the linear vibrator 1000. Moreover, since the weight 950 is vibrated horizontally, the range of displacement can be increased even though the linear vibrator 1000 becomes thinner.

The base 102, in which the components of the linear vibrator 1000 are housed, has a space that supports the components of the linear vibrator 1000. A bobbin 110 can be formed at the center of the base 102. A case 900 covers the upper side of the base 102 and forms the exterior of the linear vibrator 1000.

Figure 3:
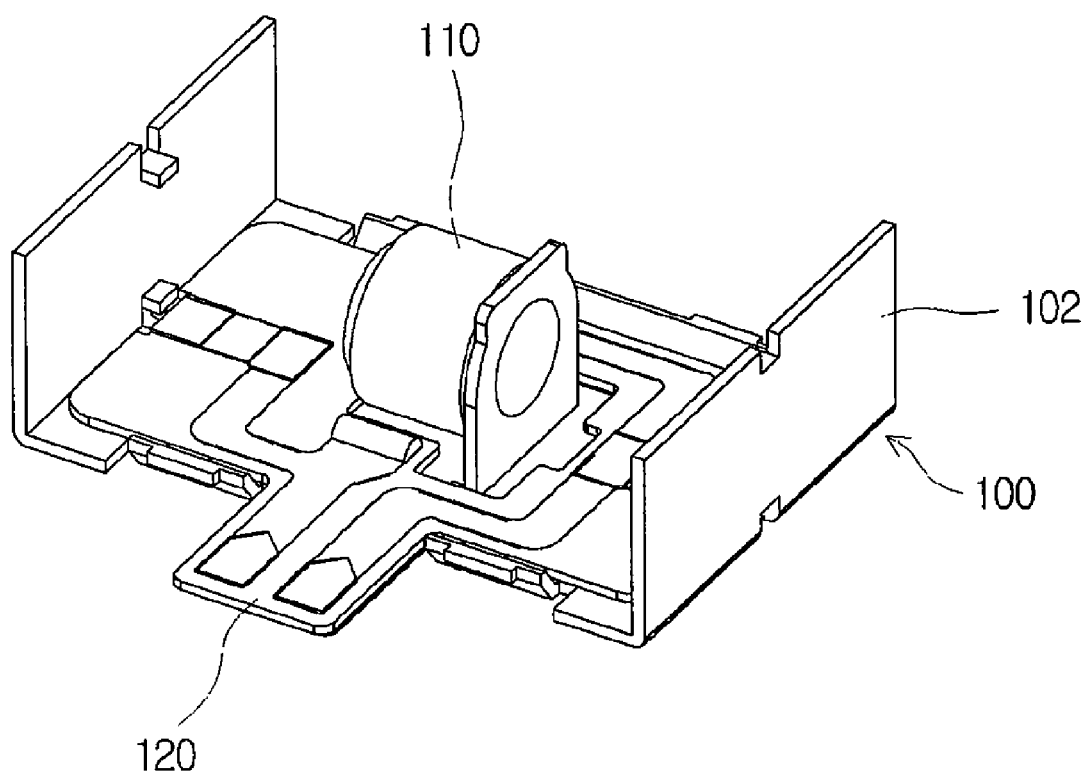
FIG. 3 is a perspective view illustrating a coil assembly of a linear vibrator in accordance with an embodiment of the present invention.

A substrate 120 is a part that provides electrical connection to the coil unit 130, which will be described later. A circuit pattern can be formed on one surface of the substrate 120. FIG. 3 is a perspective view illustrating a coil assembly 100 of a linear vibrator 1000 in accordance with an embodiment of the present invention. As illustrated in FIG. 3, the substrate 120 is installed on the base 102, and the bobbin 110 can be exposed toward the upper side of the substrate 120 through an opening formed at the center of the substrate 120.

The bobbin 110 is a part that can support the coil unit 130. The bobbin 110 can be arranged in the left-to-right direction of the base 102. The bobbin 110 can have a cylindrical shape having a hollow part 112 formed therein.

The coil unit 130 has a cylindrical shape having a hollow part formed therein with a coil being wound on the cylindrical shape. By inserting the bobbin 110 into the hollow part of the coil unit 130, the coil unit 130 can be installed on the base 102. As such, the coil assembly 100 can be constituted by assembling the base 102, the bobbin 110, the coil unit 130 and the substrate 120.

The magnet 200 has a cylinder shape extended lengthwise. By being inserted into the hollow part of the bobbin 110, the magnet 200 can move horizontally in the hollow part of the bobbin 110.

Since the magnet 200 can move horizontally with respect to the base 102, the magnet 200 can be provided with a sufficient horizontal moving space although the linear vibrator 1000 is made thinner.

In the present embodiment, the bobbin 110 formed on the base 102 forms a structure for supporting the coil unit 130. However, the coil unit 130 can be directly installed on the base 102 without an additional supporting structure, depending on the positional relationship between the coil unit 130 and the magnet 200 or the moving direction of the magnet 200.

Furthermore, in this embodiment, the coil unit 130 has a hollow part formed therein, and the magnet 200 is inserted into the hollow part, allowing the magnet 200 to move relatively with respect to the coil unit 130. However, it shall be apparent that the shape of the coil unit 130 can vary. For example, the coil unit 130 and the magnet 200 can have a flat shape and face each other.

Figure 4:
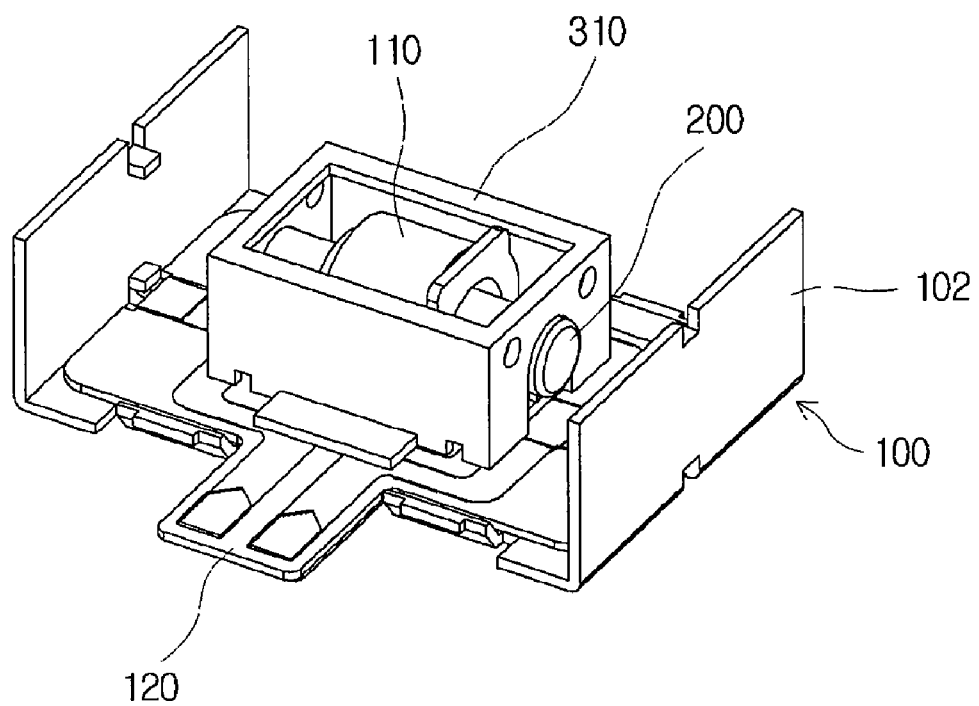
FIGS. 4 to 6 are perspective views illustrating assembling of a linear vibrator in accordance with an embodiment of the present invention.
Figure 5:
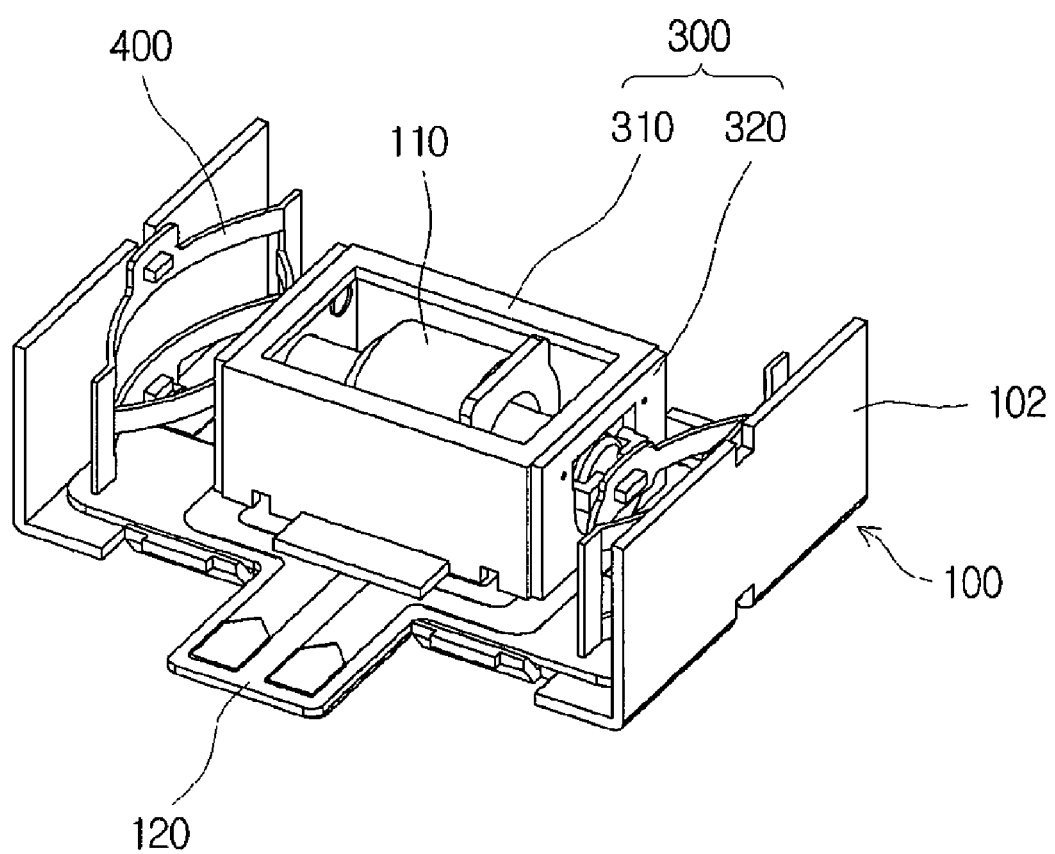
Figure 6:
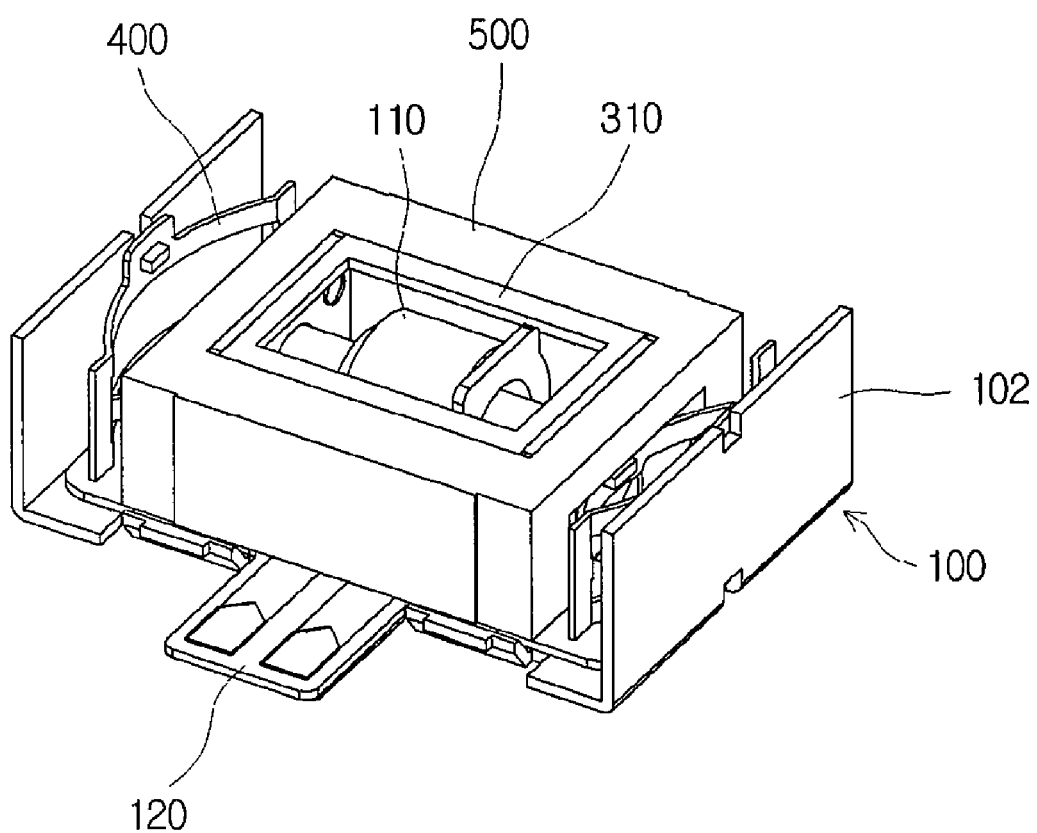

FIGS. 4 to 6 are perspective views illustrating assembling of a linear vibrator 1000 in accordance with an embodiment of the present invention. As illustrated in FIGS. 1, 4 and 5, a yoke 300 can prevent the leakage of magnetic flux of the magnet 200 and converge the magnetic flux.

The yoke 300 includes a cover yoke 310 and a back yoke 320. The cover yoke 310 can be shaped as a rectangular cuboid generally surrounding the magnet 200. Either end of the magnet 200 can be installed on either end of the cover yoke 310.

The back yoke 320 can be coupled to both ends of the magnet 200 and the cover yoke 310. Formed on one surface of the back yoke 320 can be a protrusion, to which the leaf spring 400, which will be described later, can be coupled.

The leaf spring 400 can be interposed between either end of the magnet 200 and the base 102, and can elastically support the magnet 200, the yoke 300 and the weight 950 with respect to the base 102.

As illustrated in FIG. 6, the weight 950 is a rectangular cuboid generally surrounding the yoke 300. The weight 950 is installed outside the magnet 200, and can generate vibrations through its repetitive horizontal movement with the magnet 200.

Because of the structure in which the weight 950 can move horizontally, the linear vibrator 1000 can be made thinner, and the magnitude of vibration can be increased due to the horizontally-shaped space formed in the linear vibrator 1000.

Figure 7:
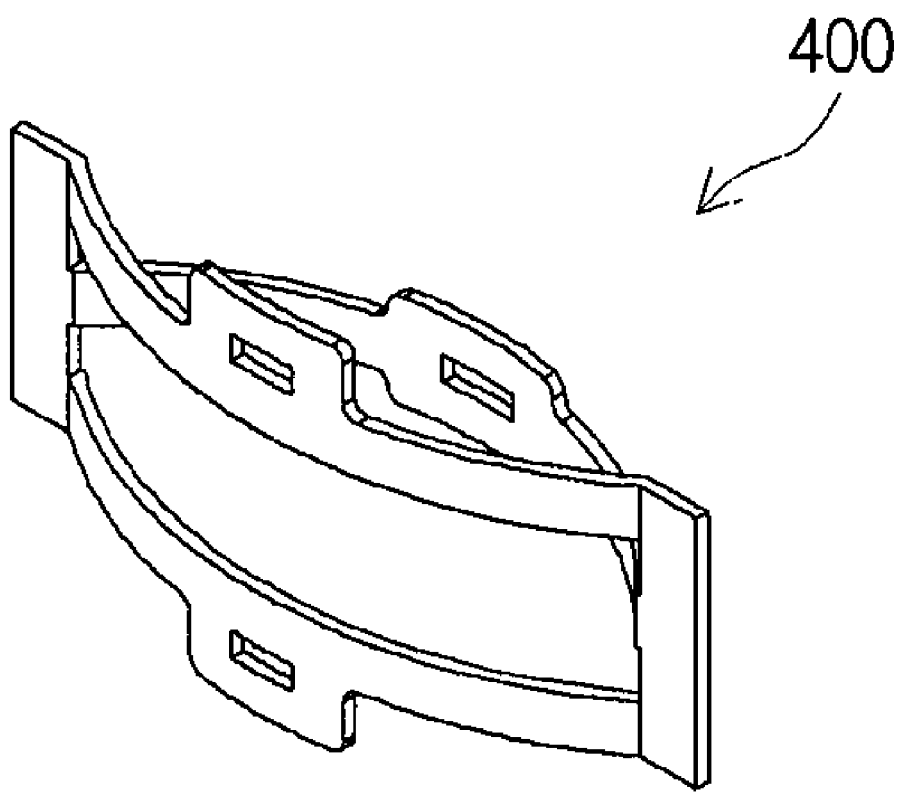
FIG. 7 is a perspective view illustrating a leaf spring of a linear vibrator in accordance with an embodiment of the present invention.
Figure 8:
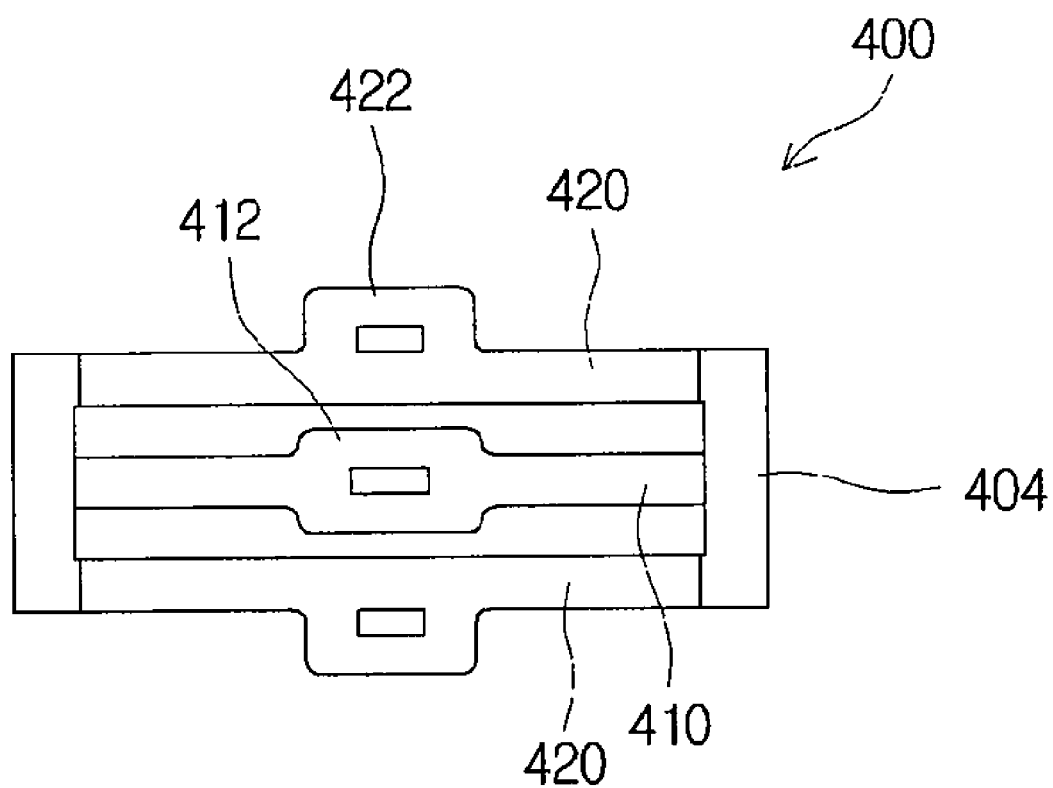
FIG. 8 is a plan view illustrating a leaf spring of a linear vibrator in accordance with an embodiment of the present invention.

FIG. 7 is a perspective view illustrating a leaf spring 400 of a linear vibrator 1000 in accordance with an embodiment of the present invention, and FIG. 8 is a plan view illustrating a leaf spring 400 of a linear vibrator 1000 in accordance with an embodiment of the present invention. As illustrated in FIGS. 7 and 8, the leaf spring 400 can be constituted by a plurality of plate-shaped members.

A first plate-shaped member 410 is disposed in the middle of the leaf spring 400, and a second plate-shaped member 420 is disposed parallel on both sides of the first plate-shaped member 410. Both respective ends of the first plate-shaped member 410 and the second plate-shaped member 420 can be connected to each other by a connection unit 404.

The center portions of the first plate-shaped member 410 and the second plate-shaped member 420 are curved in an opposite direction so that they can be kept separate from one another. The first plate-shaped member 410 and the second plate-shaped member 420 are formed symmetrically from the center.

Formed in the middle of the first plate-shaped member 410 is a fastening unit 412, which is connected to the protrusion, which has been described above, of the back yoke 320. Also formed in the middle of the second plate-shaped member 420 is a fastening unit 422, which is connected to a protrusion formed on an inner wall of the base 102.

Since the center portions of the first plate-shaped member 410 and the second plate-shaped member 420 are respectively installed on the back yoke 320 and the base 102, the leaf spring 400 can improve deflection and horizontal swing of the weight 950 even though the center portions of the first plate-shaped member 410 and the second plate-shaped member 420 are deformed in a direction in which the center portions approach each other.

Figure 9:
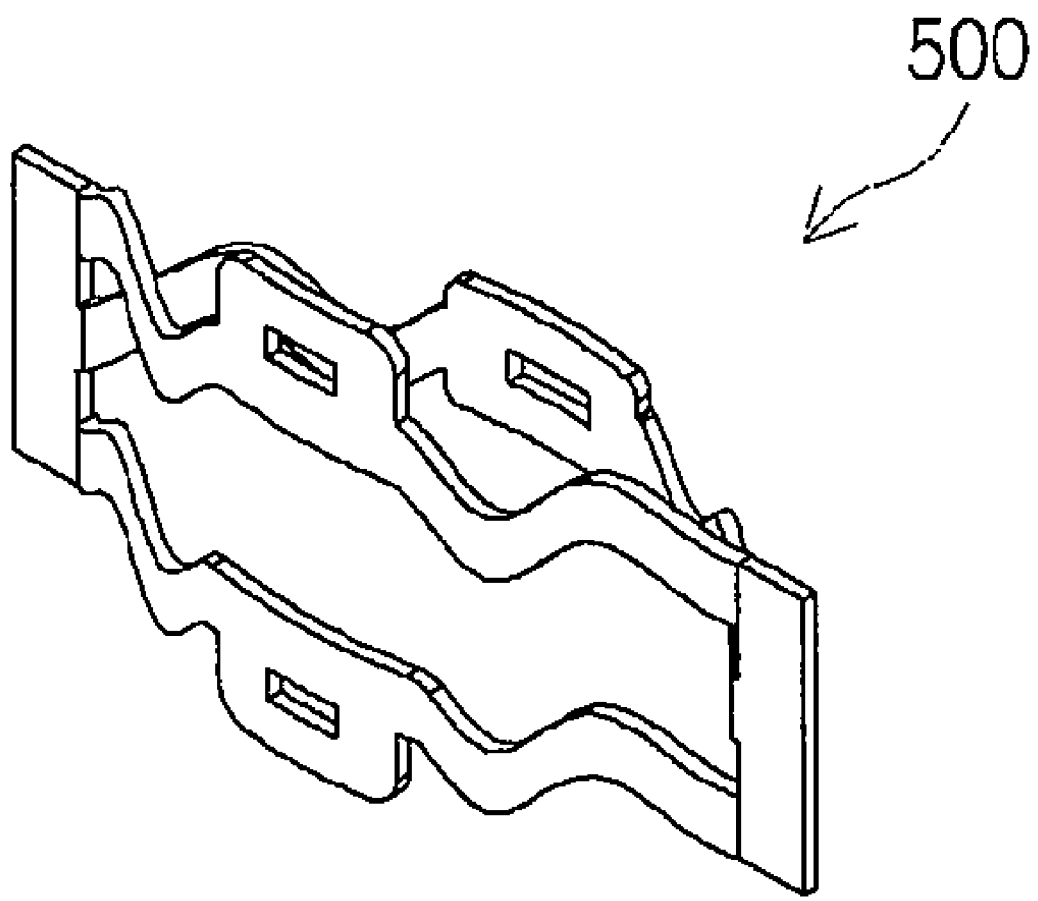
FIG. 9 is a perspective view illustrating a leaf spring of a linear vibrator in accordance with another embodiment of the present invention.

A linear vibrator in accordance with another embodiment of the present invention can have the same configuration as that of the linear vibrator 1000 in accordance with an earlier embodiment of the present invention, except the leaf spring 500. FIG. 9 is a perspective view illustrating a leaf spring 500 of a linear vibrator in accordance with another embodiment of the present invention, and FIG. 10 is a plan view illustrating a leaf spring 500 of a linear vibrator in accordance with another embodiment of the present invention.

Figure 10:
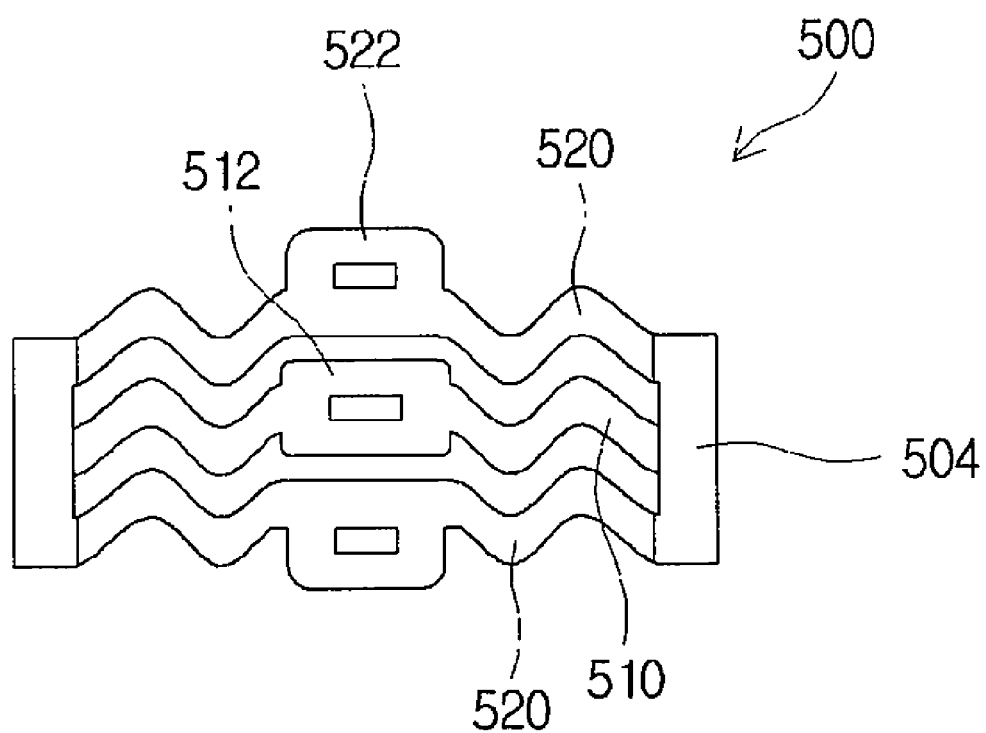
FIG. 10 is a plan view illustrating a leaf spring of a linear vibrator in accordance with another embodiment of the present invention.

As illustrated in FIGS. 9 and 10, the leaf spring 500 can be curved symmetrically from the center portions of a first plate-shaped member 510 and a second plate-shaped member 520. Formed on the center portions of the first plate-shaped member 510 and the second plate-shaped member 520 are fastening units 512 and 522, and the first plate-shaped member 510 and the second plate-shaped member 520 are formed in a corrugated shape on both sides of each of the fastening units 512 and 522. Both respective ends of the first plate-shaped member 510 and the second plate-shaped member 520 are coupled to each other by a connection unit 504.

In this embodiment, the first plate-shaped member 510 and the second plate-shaped member 520 can be elongated, and thus there is a less chance of plastic deformation in the first plate-shaped member 510 and the second plate-shaped member 520, extending the life of the leaf spring 500.

Figure 11:
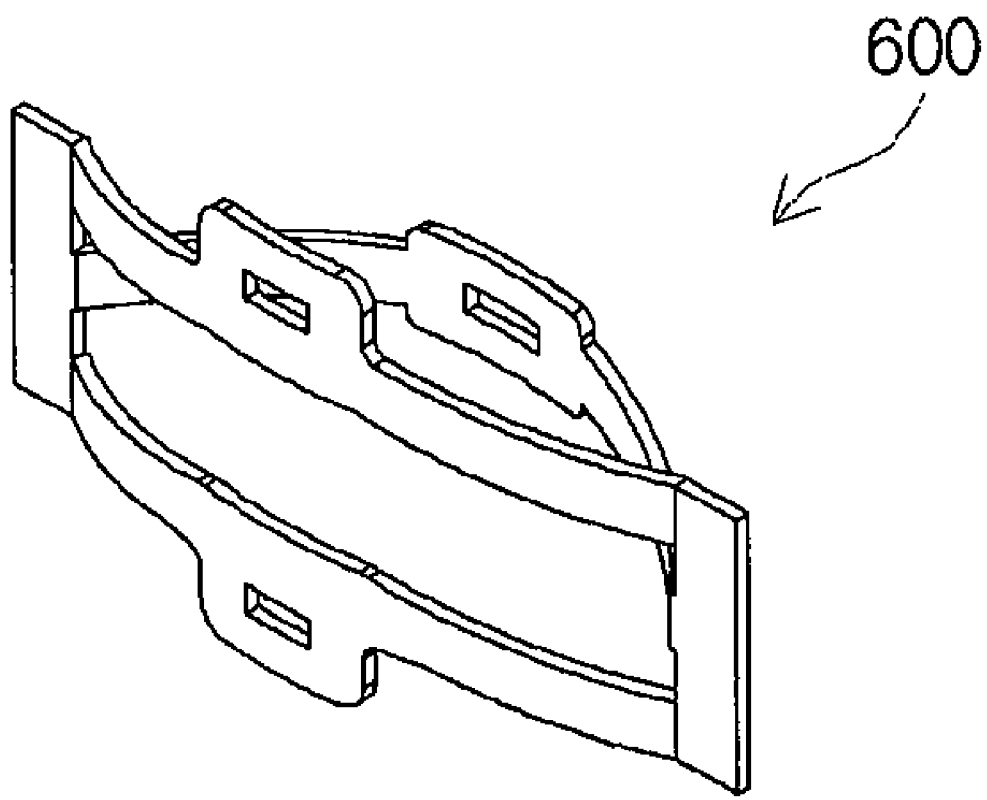
FIG. 11 is a perspective view illustrating a leaf spring of a linear vibrator in accordance with yet another embodiment of the present invention.
Figure 12:
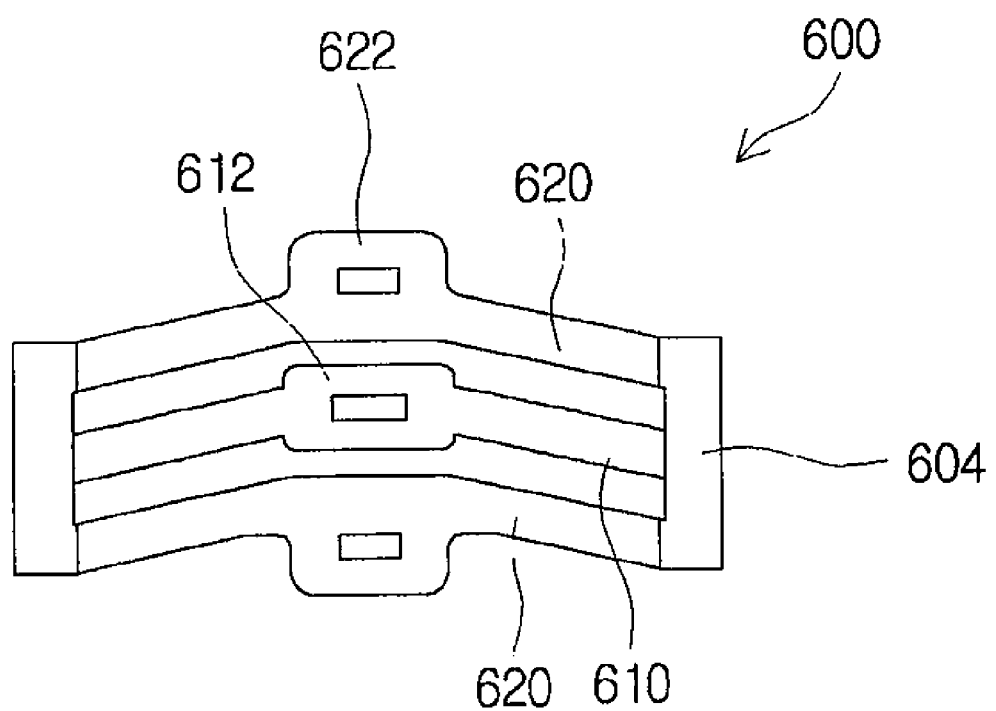
FIG. 12 is a plan view illustrating a leaf spring of a linear vibrator in accordance with yet another embodiment of the present invention.

FIG. 11 is a perspective view illustrating a leaf spring 600 of a linear vibrator in accordance with yet another embodiment of the present invention, and FIG. 12 is a plan view illustrating a leaf spring 600 of a linear vibrator in accordance with yet another embodiment of the present invention.

A linear vibrator in accordance with the present embodiment can have the same configuration as that of the linear vibrator 1000 in accordance with an earlier embodiment of the present invention, except the leaf spring 600.

In this embodiment, as illustrated in FIGS. 11 and 12, a first plate-shaped member 610 and a second plate-shaped member 620 of the leaf spring 600 can be tilted symmetrically from both ends of the first plate-shaped member 610 and the second plate-shaped member 620. Therefore, the leaf spring 600 can have a generally "V" shaped form.

Formed in the middle of the first plate-shaped member 610 and the second plate-shaped member 620 are fastening units 612 and 622, and the first plate-shaped member 610 and the second plate-shaped member 620 are extended tilting downward from both ends of the fastening units 612 and 622. A connection unit 604 is formed on both ends of the first plate-shaped member 610 and the second plate-shaped member 620, and can connect the first plate-shaped member 610 to the second plate-shaped member 620.

In this embodiment, the first plate-shaped member 610 and the second plate-shaped member 620 can be elongated, and thus the life of the leaf spring 600 can be extended.

In one possible embodiment of the present invention, a leaf spring having a different elastic modulus can be implemented by variously changing the shape of a plate-shaped member and adjusting the length thereof.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A linear vibrator, comprising:
a base;
a coil unit coupled to the base;
a magnet having two ends and coupled to the coil unit such that the magnet is movable relatively with respect to the coil unit; and
a leaf spring interposed between the base and one of the two ends of the magnet, the leaf spring comprising a plurality of plate-shaped members having respective center portions and respective first and second ends, the respective center portions being separated from one another, the respective first ends of the plate-shaped members being coupled to one another, the respective second ends of the plate-shaped members being coupled to one another, wherein
the leaf spring includes: a first plate-shaped member having a center portion contactably coupled to the magnet; and a second plate-shaped member having a center portion contactably coupled to the base, and
the first plate-shaped member and the second plate-shaped member are parallel to each other.

2. The linear vibrator of claim 1, wherein the first plate-shaped member and the second plate-shaped member are curved symmetrically about center portions thereof.

3. The linear vibrator of claim 1, wherein the first plate-shaped member and the second plate-shaped member are extended tilting symmetrically from both ends thereof to the center.

4. The linear vibrator of claim 1, wherein a hollow part is formed in the coil unit, and the magnet is inserted into the hollow part.

5. The linear vibrator of claim 4, further comprising a bobbin coupled to the hollow part of the coil unit such that the coil unit can be coupled to the base, the magnet being inserted into the bobbin.

6. The linear vibrator of claim 5, wherein the magnet is inserted into the bobbin in such a way that the magnet can move horizontally.

7. The linear vibrator of claim 1, further comprising a weight coupled to the magnet.

8. The linear vibrator of claim 7, further comprising a yoke interposed between the magnet and the weight and surrounding the magnet.

* * * * *